(12) United States Patent
Beets

(10) Patent No.: US 12,315,035 B2
(45) Date of Patent: *May 27, 2025

(54) INPUT/OUTPUT FILTER UNIT FOR GRAPHICS PROCESSING UNIT

(71) Applicant: Imagination Technologies Limited, Kings Langley (GB)

(72) Inventor: Kristof Beets, Abbots Langley (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,138

(22) Filed: Mar. 4, 2024

(65) Prior Publication Data
US 2024/0202864 A1   Jun. 20, 2024

Related U.S. Application Data

(63) Continuation of application No. 17/350,534, filed on Jun. 17, 2021, now Pat. No. 11,922,536.

(30) Foreign Application Priority Data

Jun. 17, 2020   (GB) ..................................... 2009266

(51) Int. Cl.
*G06T 1/60*   (2006.01)
*G06F 7/57*   (2006.01)
(Continued)

(52) U.S. Cl.
CPC .................. *G06T 1/60* (2013.01); *G06F 7/57* (2013.01); *G06F 13/122* (2013.01); *G06T 11/001* (2013.01)

(58) Field of Classification Search
None
See application file for complete search history.

(56) References Cited

U.S. PATENT DOCUMENTS 10,371,732 B2 * 8/2019 Al-Adnani ........... G01R 23/167
11,069,095 B1   7/2021 Makarov
(Continued)

FOREIGN PATENT DOCUMENTS

WO   2009/091369 A1   7/2009

OTHER PUBLICATIONS

Chih-Hao Sun et al, "CFU: multi-purpose configurable filtering unit for mobile multimedia applications on graphics hardware," Proceedings of the Conference on High Performance Graphics, 2009, pp. 29-36.

*Primary Examiner* — James A Thompson
*Assistant Examiner* — Kim Thanh T Tran
(74) *Attorney, Agent, or Firm* — Potomac Law Group, PLLC; Vincent M DeLuca

(57) ABSTRACT

Input/output filter units for use in a graphics processing unit include a first buffer configured to store data received from, and output to, a first component of the graphics processing unit; a second buffer configured to store data received from, and output to, a second component of the graphics processing unit; a weight buffer configured to store filter weights; a filter bank configurable to perform any of a plurality of types of filtering on a set of input data, the plurality of types of filtering comprising one or more texture filtering types and one or more pixel filtering types; and control logic configured to cause the filter bank to: (i) perform one of the plurality of types of filtering on a set of data stored in one of the first and second buffers using a set of weights stored, and (ii) store the results of the filtering in one of the first and second buffers.

20 Claims, 8 Drawing Sheets

(51) Int. Cl.
*G06F 13/12* (2006.01)
*G06T 11/00* (2006.01)

(56) References Cited

U.S. PATENT DOCUMENTS

| | | |
|---|---|---|
| 11,275,997 B1 | 3/2022 | Vantrease et al. |
| 2004/0017515 A1 | 1/2004 | Lange et al. |
| 2009/0015717 A1* | 1/2009 | Arnao .................. G06T 3/4023 |
| | | 348/581 |
| 2011/0158329 A1 | 6/2011 | Oettinger et al. |
| 2016/0042549 A1 | 2/2016 | Li et al. |
| 2016/0078666 A1 | 3/2016 | Park et al. |
| 2019/0045192 A1* | 2/2019 | Socek .................. H04N 19/573 |
| 2019/0066370 A1 | 2/2019 | Schmalsteig et al. |
| 2019/0080504 A1* | 3/2019 | Fielding .................. G06T 15/80 |
| 2020/0005526 A1 | 1/2020 | Feng et al. |
| 2021/0158132 A1* | 5/2021 | Huynh .................. G06N 3/045 |

* cited by examiner

INPUT/OUTPUT FILTER UNIT FOR GRAPHICS PROCESSING UNIT

CROSS-REFERENCE TO RELATED APPLICATIONS AND CLAIM OF PRIORITY

This application is a continuation, under 35 U.S.C. 120, of copending application Ser. No. 17/350,534 filed Jun. 17, 2021, now U.S. Pat. No. 11,922,536, which claims foreign priority under 35 U.S.C. 119 from United Kingdom Application No. 2009266.4 filed Jun. 17, 2020, the contents of which are incorporated by reference herein in their entirety.

BACKGROUND

A graphics processing unit (GPU) may be used to process geometry data (e.g. vertices defining primitives or patches) generated by an application in order to generate image data. Specifically, a GPU may determine pixel values (e.g. colour values) of an image to be stored in a frame buffer which may be output to a display.

A GPU may process the received geometry data in two phases—a geometry processing phase and a rasterization phase. In the geometry processing phase a vertex shader is applied to the received geometry data (e.g. vertices defining primitives or patches) received from an application (e.g. a game application) to transform the geometry data into the rendering space (e.g. screen space). Other functions such as clipping and culling to remove geometry (e.g. primitives or patches) that falls outside of a viewing frustum, and/or lighting/attribute processing may also be performed in the geometry processing phase.

In the rasterization phase the transformed primitives are mapped to pixels and the colour is identified for each pixel. This may comprise rasterizing the transformed geometry data (e.g. by performing scan conversion) to generate primitive fragments. The term "fragment" is used herein to mean a sample of a primitive at a sampling point, which is to be processed to render pixels of an image. In some examples, there may be a one-to-one mapping of pixels to fragments. However, in other examples there may be more fragments than pixels, and this oversampling can allow for higher quality rendering of pixel values.

The primitive fragments that are hidden (e.g. hidden by other fragments) may then be removed through a process called hidden surface removal. Texturing and/or shading may then be applied to primitive fragments that are not hidden to determine pixel values of a rendered image. For example, in some cases, the colour of a fragment may be identified by applying a texture to the fragment. As is known to those of skill in the art, a texture, which may also be referred to as a texture map, is an image which is used to represent precomputed colour, lighting, shadows etc. Texture maps are formed of a plurality of texels (i.e. colour values), which may also be referred to as texture elements or texture pixels. Applying a texture to a fragment generally comprises mapping the location of the fragment in the render space to a position or location in the texture and using the colour at that position in the texture as the texture colour for the fragment. As described below, the texture colour may then be used to determine the final colour for the fragment. A fragment whose colour is determined from a texture may be referred to as a texture mapped fragment.

As fragment positions rarely map directly to a specific texel, the texture colour of a fragment is typically identified through a process called texture filtering. In the simplest case, which may be referred to as point sampling or point filtering, a fragment is mapped to a single texel (e.g. the closest texel to the position of interest) and that texel value (i.e. colour) may be used as the texture colour of the fragment. However, in most cases, the texture colour for a fragment is determined using more complicated filtering techniques which combine a plurality of texels close to the relevant position in the texture. For example, multiple texels close to the relevant position in the texture may be combined using a filtering technique, such as, but not limited to, bilinear, trilinear or anisotropic filtering, to determine the texture colour for a fragment.

The texture colour(s) output by the texture filtering may then be used as input to a fragment shader. As is known to those of skill in the art, a fragment shader (which may alternatively be referred to as a pixel shader) is a program (e.g. a set instructions) that operates on individual fragments to determine the colour, brightness, contrast etc. thereof. A fragment shader may receive as input a fragment (e.g. the position thereof) and one or more other input parameters (e.g. texture co-ordinates) and output a colour value in accordance with a specific shader program. In some cases, the output of a pixel shader may be further processed. For example, where there are more samples than pixels, an anti-aliasing technique, such as multi-sample anti-aliasing (MSAA), may be used to generate the colour for a particular pixel from multiple samples (which may be referred to as sub-samples). Anti-aliasing techniques apply a filter, such as, but not limited to, a box filter to the multiple samples to generate a single colour value for a pixel.

A GPU which performs hidden surface removal prior to performing texturing and/or shading is said to implement 'deferred' rendering. In other examples, a GPU might not implement deferred rendering in which case texturing and shading may be applied to fragments before hidden surface removal is performed on those fragments. In either case, the rendered pixel values may be stored in memory (e.g. frame buffer).

As texture filtering and pixel filtering (e.g. MSAA filtering) are complex operations, instead of programming one or more ALUs (arithmetic logic units) to perform the filtering, a GPU may have dedicated hardware to perform texture filtering and pixel filtering. For example, reference is now made to FIG. 1 which illustrates an example GPU 100. The example GPU 100 comprises a plurality of ALU clusters 102 (which may be referred to as unified shading clusters) each of which comprises a plurality of ALUs which can be configured to execute multiple types of shaders (e.g. vertex shaders run in the geometry processing phase, fragment/pixel shaders run in the rasterization phase, and compute shaders) which are generated by one of a plurality of data masters 104, 106, 108. For example, in FIG. 1 the GPU 100 comprises a vertex data master 104 that initiates or generates vertex shader tasks, a pixel data master 106 that initiates or generates pixel or fragment shader tasks, and a compute data master 108 that initiates or generates compute shader tasks.

In the example of FIG. 1 a micro controller 110 receives vertex, pixel and compute tasks from a host (e.g. central processing unit (CPU)) and causes the corresponding data master 104, 106, 108 to generate or initiate the task. For example, when the micro controller 110 receives a vertex task the micro controller 110 may be configured to cause the vertex data master 104 to generate the task. In response to receiving a task request from the micro controller 110, a data master 104, 106, 108 generates the task and sends it to a scheduler 112 (which may also be referred to as a coarse grain scheduler) where it is added to a task queue. The scheduler 112 is configured to allocate resources to the tasks in the queue and then schedule and issue the tasks to the ALU clusters 102 (e.g. to a fine grain scheduler (FGS) within the ALU cluster). Each ALU cluster 102 then schedules (e.g. via the FGS) and executes the tasks received from the scheduler 112.

As described above, in some cases, during the rasterization phase a texture colour is identified for one or more fragments via texture filtering. During the texture filtering process, a position or location in a texture from which a particular fragment is drawn is identified (which may be referred to as the relevant texture co-ordinate or the mapped texture co-ordinate), one or more texels near the identified position (which may referred to as the relevant texels) are read from the texture, and the texture colour for the fragment is determined by applying one or more filters to the relevant texels. To perform texture filtering efficiently, the GPU 100 in FIG. 1 has a dedicated unit, referred to as the texture unit 114, for performing texture filtering. Example texture filtering methods or techniques which may be implemented by the texture unit 114 include, but are not limited to: bilinear filtering in which the four nearest texels to the identified texture position are read and combined by weighted average according to distance to produce the texture colour for the fragment; trilinear filtering which comprises performing a texture lookup and bilinear filtering of the two closest mipmap levels (one higher and one lower detail) and then linearly interpolating the results to produce the texture colour for the fragment; anisotropic filtering wherein several texels around the identified texture position are read, but on a sample pattern mapped according to the projected shape of the texture at that fragment; and percentage closer filtering (PCF) which uses depth comparison to determine the texture colour of a fragment. Accordingly, the texture unit 114 is configured to fetch one or more samples (i.e. texels) from a texture stored in memory (not shown), perform a filter operation on the fetched samples (i.e. texels) according to a texture filtering method, and provide the output of the filter operation to an ALU cluster as input for, for example, a fragment/pixel shader task. Specifically, as described above, the texture colour for a fragment generated by the texture unit 114 may be provided to an ALU cluster as an input to a fragment/pixel shader task (e.g. a task generated by the pixel data master 106). In some cases, the memory (not shown) may be accessible via one or more interfaces 118 and/or a system level cache 120.

As described above, in some cases the output of a pixel shader may be further processed before it is output. Specifically, one or more filters may be applied to the output(s) of a pixel shader (which may be referred to herein as pixel filtering) to implement one or more post processing techniques. For example, where there are more samples than pixels, a box filter or another filter may be applied to the output for multiple samples to implement an anti-aliasing technique, such as, but not limited to MSAA, to generate the colour for a particular pixel. To perform this pixel filtering efficiently the GPU 100 of FIG. 1 has a dedicated unit, which is referred to as the pixel back end 116, which is configured to receive the outputs of fragment/pixel shader tasks from the ALU clusters 102, determine the individual pixel colours therefrom and output the pixel colours to memory. In some cases, this may comprise, for example, applying a box filter to the data received from the ALU clusters 102 to implement MSAA or the like, or down-sampling the data received from the ALU clusters 102, and writing the output of the filtering to memory. However, in other cases, this may simply comprise outputting the received pixel. The pixel back end 116 may also be able to perform format conversions. For example, the pixel back end 116 may receive colour values in one format (e.g. 16-bit floating point format (FP16)) and output the colour values in another format (e.g. 8-bit fixed point or integer format (8INT)).

The embodiments described below are provided by way of example only and are not limiting of implementations which solve any or all of the disadvantages of known methods and hardware for performing texture filtering and pixel filtering.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are input/output filter units for use in a graphics processing unit. The input/output filter units include: a first buffer configured to store data received from, and output to, a first component of the graphics processing unit; a second buffer configured to store data received from, and output to, a second component of the graphics processing unit; a weight buffer configured to store filter weights; a filter bank configurable to perform any of a plurality of types of filtering on a set of input data, the plurality of types of filtering comprising one or more texture filtering types and one or more pixel filtering types; and control logic configured to cause the filter bank to: (i) perform one of the plurality of types of filtering on a set of data stored in one of the first and second buffers using a set of weights stored in the weight buffer, and (ii) store the results of the filtering in one of the first and second buffers.

A first aspect provides an input/output filter unit for use in a graphics processing unit, the input/output filter unit comprising: a first buffer configured to store data received from, and output to, a first component of the graphics processing unit; a second buffer configured to store data received from, and output to, a second component of the graphics processing unit; a weight buffer configured to store filter weights; a filter bank configurable to perform any of a plurality of types of filtering on a set of input data, the plurality of types of filtering comprising one or more types of texture filtering and one or more types of pixel filtering; and control logic configured to cause the filter bank to: (i) perform one of the plurality of types of filtering on a set of data stored in one of the first and second buffers using a set of weights stored in the weight buffer, and (ii) store the results of the filtering in one of the first and second buffers.

The filter bank may comprise one or more filter blocks, each filter block comprising a plurality of arithmetic components that can be selectively enabled so as to cause the filter bank to perform one of the plurality of types of filtering.

The plurality of arithmetic components may be configured so as to form a pipeline.

The plurality of arithmetic components may comprise a set of arithmetic components that form an n input×n weight filter wherein n is an integer.

The set of arithmetic components may comprise n multiplier components each of which is configured to multiply an input value and a weight, and a plurality of adder components than form an adder tree configured to produce the sum of the outputs of the n multipliers.

The plurality of arithmetic components may further comprise n comparators each of which is configured to compare an input value and provide the result of the comparison as an input to the n input×n weight filter.

The plurality of arithmetic components may further comprise a scaling component configured to receive the output of the n input×n weight filter and generate a scaled version thereof.

The filter bank may comprise a plurality of filter blocks.

The control logic may be configured to cause the filter bank to perform one of the plurality of types of filtering on a set of data stored in one of the first and second buffers using a set of weights stored in the weight buffer by causing one of the filter blocks to perform a first portion of the type of filtering in a first pass of the filter block and a second portion of the type of filtering in a second pass of the filter block.

Temporary data may be generated during at least one of the first pass and the second pass which is stored in one of the first and second buffers The one or more types of texture filtering may comprise one or more of bilinear filtering, trilinear filtering, anisotropic filtering and percentage closer filtering The one or more types of pixel filtering may comprise one or more of down-sampling, up-sampling and multiple sampling anti aliasing box filtering.

The filter bank may be further configurable to perform texture blending.

The filter bank may be further configurable to perform a set of convolution operations as part of processing a convolution layer of a neural network The input/output filter unit may further comprise a texture address generator configured to generate an address for one or more relevant texels for performing a type of texture filtering for a fragment or a pixel.

The input/output filter unit may further comprise a weight generator configured to generate the set of weights for performing one or more types of filtering and store the generated weights in the weight buffer.

The first component may be an arithmetic logic unit cluster configured to perform shading tasks and the second component is memory.

The control logic may be configured to cause the filter bank to perform a filtering task of a plurality of filtering tasks, the plurality of filtering tasks comprising texture filtering tasks and pixel filtering tasks. Causing the filter bank to perform a pixel filtering task may comprise causing the filter bank to perform one of the one or more types of pixel filtering on a set of data stored in the first buffer by the arithmetic logic unit cluster using a set of weights stored in the weight buffer, and store the results of the pixel filtering in the second buffer to be output to the memory. Causing the filter bank to perform a texture filtering task may comprise causing the filter bank to perform one of the one or more types of texture filtering on a set of data stored in the second buffer from the memory using a set of weights stored in the weight buffer, and store the results of the texture filtering in the first buffer to be output to the arithmetic logic unit cluster.

The control logic may be configured to store the results of the filtering in the other of the first and second buffers.

The input/output filter unit may be embodied in hardware on an integrated circuit.

A second aspect provides a method of controlling an input/output filter unit comprising a first buffer, a second buffer, a weight buffer and a configurable filter bank, the method comprising: receiving information identifying a filtering task, the information identifying the filtering task comprising information identifying a set of data stored in one of the first and second buffers, a set of weights stored in the weight buffer, and a type of filtering of a plurality of types of filtering, wherein the plurality of types of filtering comprises one or more types of texture filtering and one or more types of pixel filtering; causing the configurable filter bank to: perform the identified type of filtering on the identified set of data using the identified set of weights; and store results of the filtering in one of the first and second buffers.

A third aspect provides a graphics processing unit comprising the input/output filter unit of the first aspect.

The input/output filter units and graphics processing units described herein may be embodied in hardware on an integrated circuit. There may be provided a method of manufacturing, at an integrated circuit manufacturing system, an input/output filter unit or a graphics processing unit described herein. There may be provided an integrated circuit definition dataset that, when processed in an integrated circuit manufacturing system, configures the system to manufacture the input/output filter unit or the graphics processing unit. There may be provided a non-transitory computer readable storage medium having stored thereon a computer readable description of an input/output filter unit or a graphics processing unit that, when processed in an integrated circuit manufacturing system, causes the integrated circuit manufacturing system to manufacture an integrated circuit embodying the input/output filter unit or the graphics processing unit.

There may be provided an integrated circuit manufacturing system comprising: a non-transitory computer readable storage medium having stored thereon a computer readable description of an input/output filter unit or a graphics processing unit described herein; a layout processing system configured to process the computer readable description so as to generate a circuit layout description of an integrated circuit embodying the input/output filter unit or the graphics processing unit; and an integrated circuit generation system configured to manufacture the input/output filter unit or the graphics processing unit according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
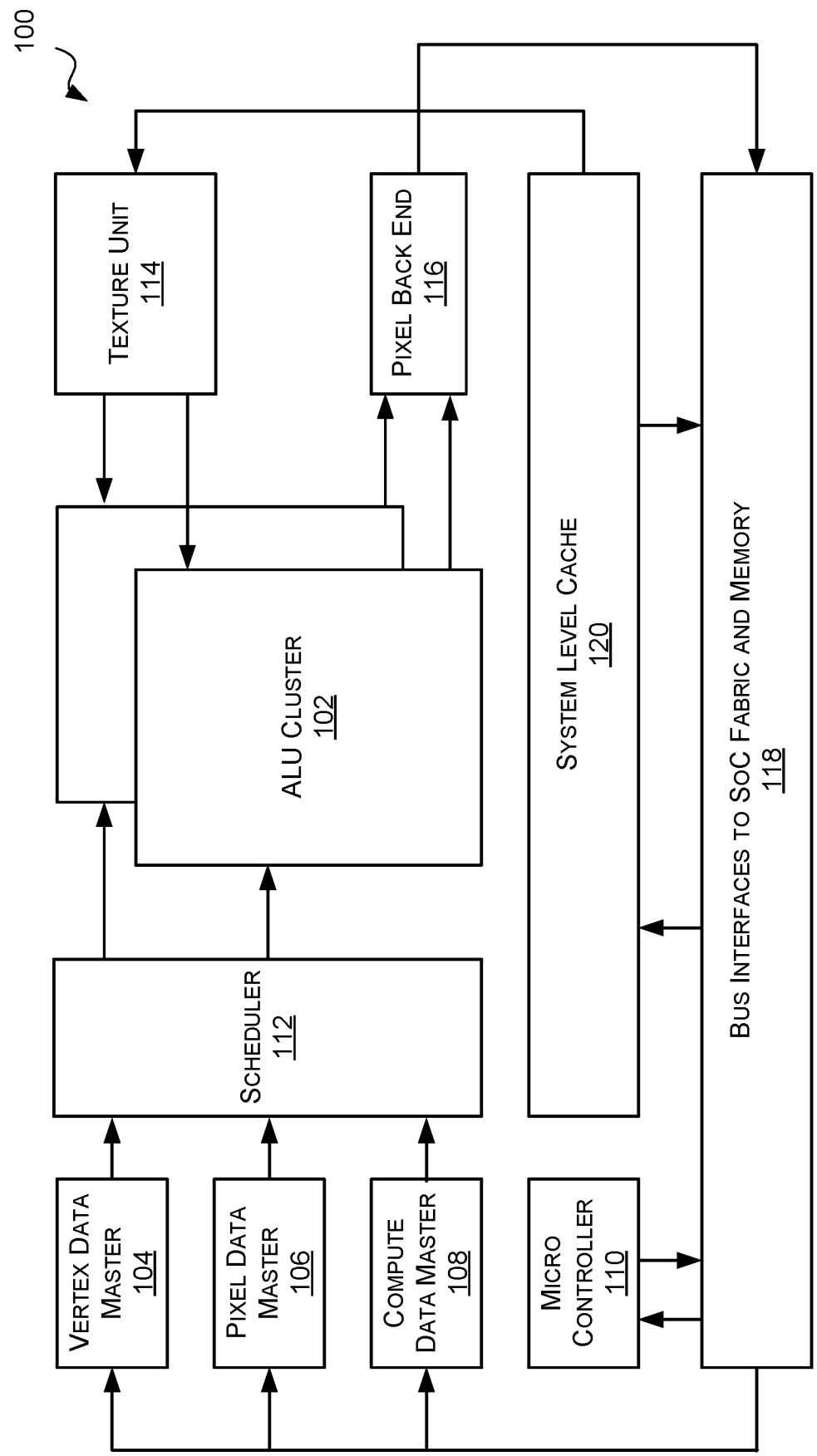
FIG. 1 is a block diagram of a first example graphics processing unit.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

The inventor has identified that the texture unit 114 and pixel back end 116 of FIG. 1 perform similar filter, or filter-like operations on similar data, but are separate hardware units. This creates an inefficiency since it duplicates hardware which unnecessarily increases the cost and complexity of the GPU. This can be addressed by replacing the texture unit 114 and the pixel back end 116 with a single input/output (I/O) filter unit that can be dynamically configured to perform texture filtering, pixel filtering, or both texture filtering and pixel filtering. Not only does this avoid the duplication of filter logic, but it can increase the throughput of the GPU and improve load balancing when there are more texture filtering tasks than pixel filtering tasks or vice versa. For example, it allows all of the I/O filter unit resources to be used for texture filtering when there is no pixel filtering to be done instead of leaving the pixel back end 116 idle. Similarly, it allows all of the I/O filter unit resources to be used for pixel filtering when there is no texture filtering to be performed instead of leaving the texture unit 114 idle or unused. Furthermore, the connections (e.g. wires) between the ALU clusters 102 and other components are expensive and thus replacing two units connected to the ALU clusters 102 with one allows the number of connections (e.g. wires) from the ALU clusters 102 to be reduced.

Accordingly, described herein are input/output filter units, for use in a graphics processing unit, which can perform both texture filtering, such as bilinear filtering and trilinear filtering; and pixel filtering, such as filtering to implement MSAA or other anti-aliasing techniques, down-sampling and/or up-sampling. Specifically, the input/output filter units described herein comprise a filter bank that comprises one or more filter blocks. Each filter block can be dynamically configured to perform one of a plurality of types of filtering on input data. The plurality of types of filtering include one or more types of texture filtering and one or more types of pixel filtering. The input data may be received from the ALU clusters and the result of the filtering may be output to memory; or the input data may be received (or read) from memory and the result of the filtering may be output to an ALU cluster for use as an input to a task (e.g. fragment/pixel shader task) executed by the ALU cluster. In some cases, there are at least two filter blocks so multiple filtering tasks can be performed in parallel.

Figure 2:
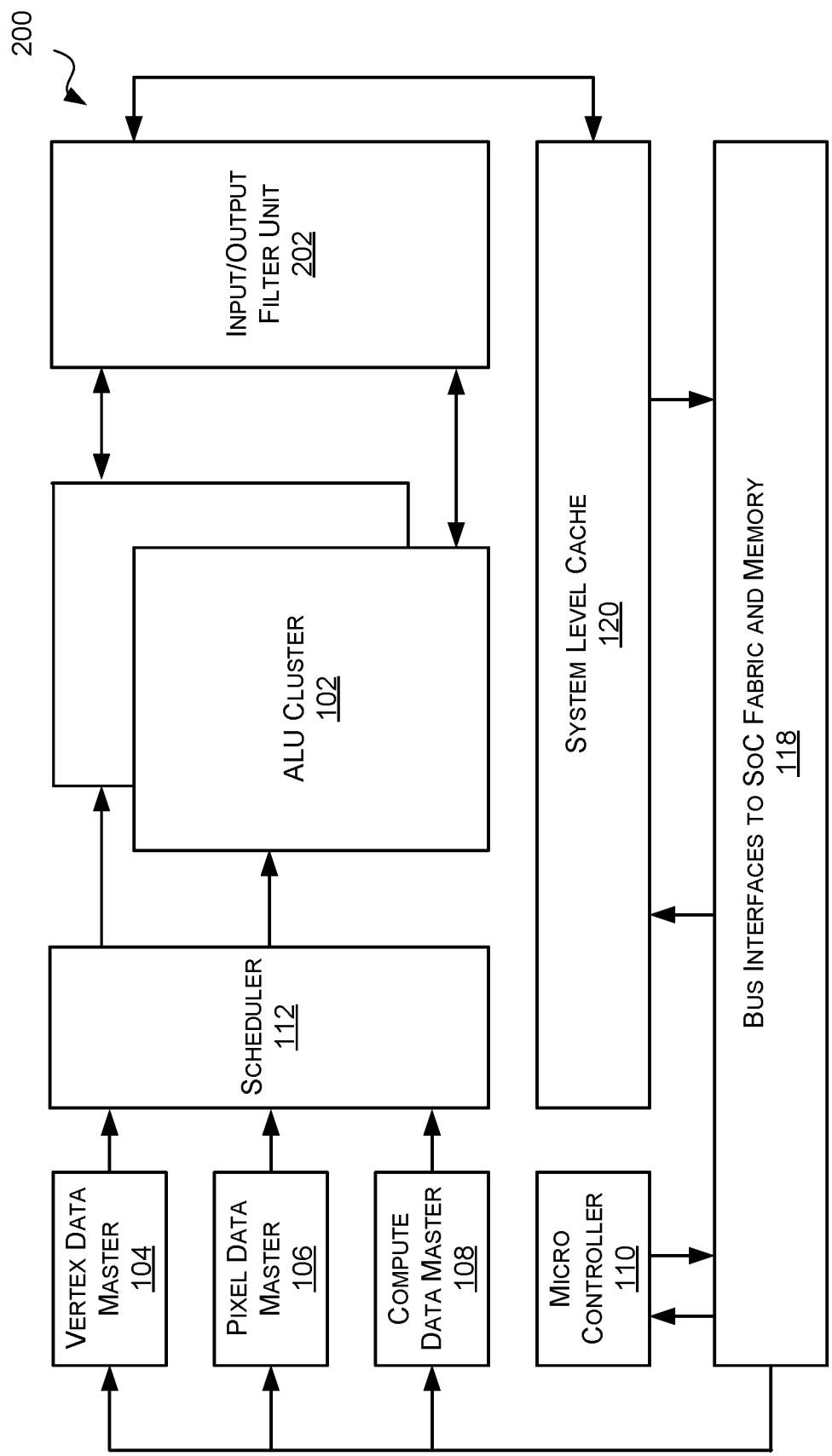
FIG. 2 is a block diagram of a second example graphics processing unit comprising an input/output filter unit.

Reference is now made to FIG. 2 which illustrates an example GPU 200 that comprises an input/output filter unit 202. The GPU 200 of FIG. 2 is similar to the GPU 100 of FIG. 1 in that it comprises a plurality of ALU clusters 102, a vertex data master 104, a pixel data master 106, a compute data master 108, a micro controller 110 and a scheduler 112 which operate as described above with respect to FIG. 1. However, instead of comprising a separate texture unit 114 and pixel back end 116 like the GPU 100 of FIG. 1, the GPU 200 of FIG. 2 comprises a single input/output (I/O) filter unit 202 that can perform texture filtering and pixel filtering. Specifically, the input/output filter unit 202 is capable of performing (i) texture filtering on texels read from memory to generate data (e.g. a texture colour) which can be used as an input to a task executed by an ALU cluster, and (ii) pixel filtering on pixels/samples (e.g. colour values) generated by the ALU cluster 102. For example, the input/output filter unit 202 may comprise a filter bank that comprises one or more filter blocks each of which can be dynamically configured to apply one of a plurality of types of filtering to input data. An example implementation of the input/output filter unit 202 will be described with respect to FIG. 3.

Figure 3:
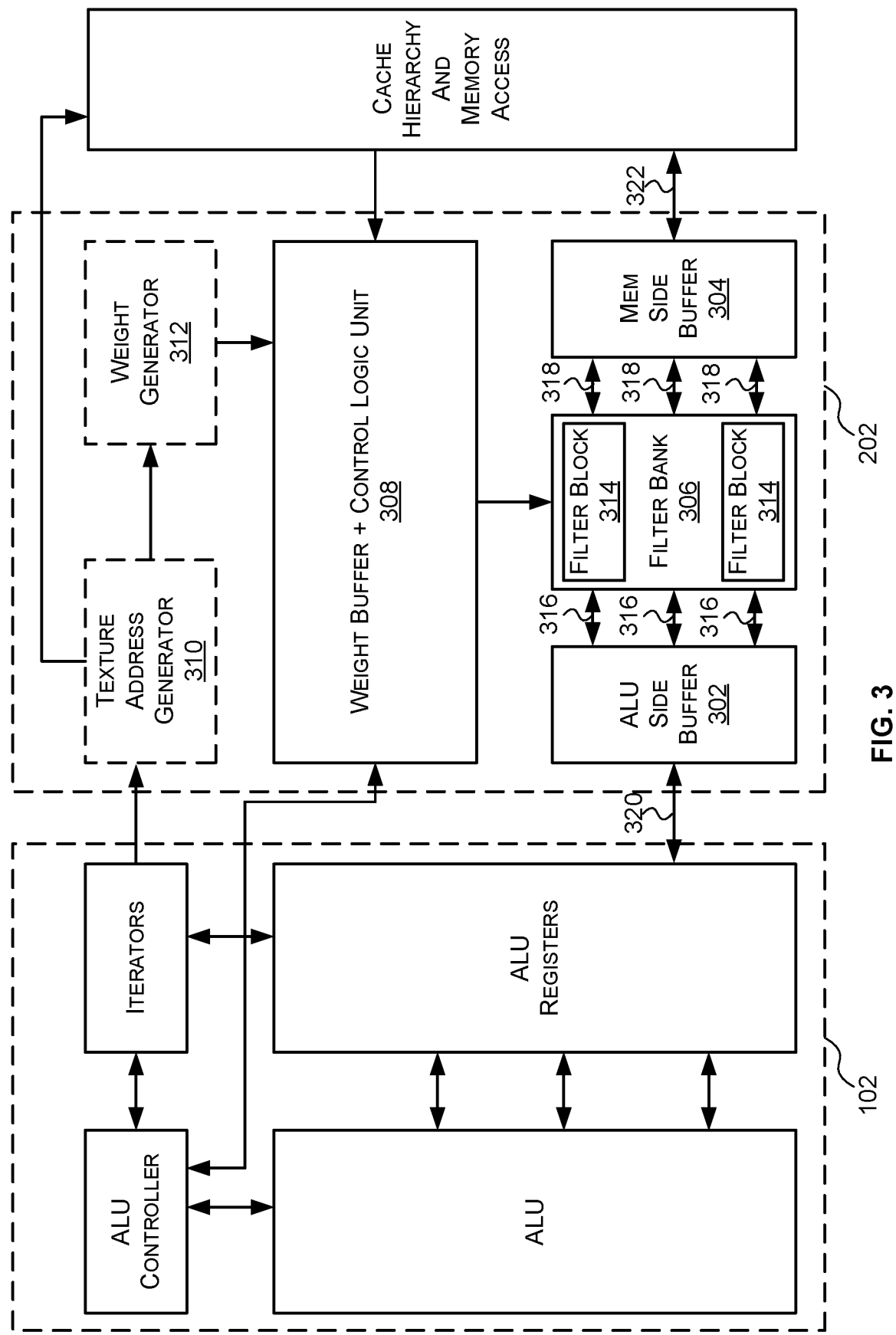
FIG. 3 is a block diagram of an example implementation of the input/output filter unit of FIG. 2 comprising one or more filter blocks.
Figure 4:
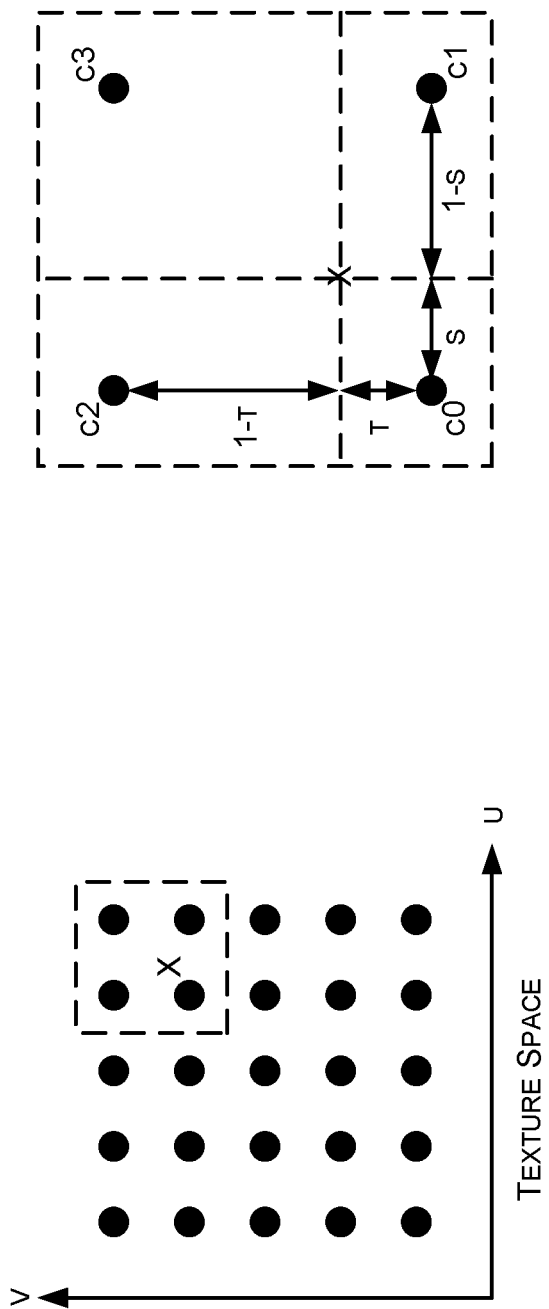
FIG. 4 is a schematic diagram illustrating bilinear filtering.

Reference is now made to FIG. 3 which illustrates an example implementation of the input/output filter unit 202 of FIG. 2. In this example, the input/output filter unit 202 comprises a first data buffer, which may be referred to as the ALU-side buffer 302; a second data buffer, which may be referred to as the memory-side buffer 304; a filter bank 306; and a weight buffer and control logic unit 308. In some cases, the input/output filter unit 202 may also comprise a texture address generator 310 and/or a weight generator 312.

The ALU-side buffer 302 is configured to temporarily store data received from, and sent to, the ALU clusters 102. Data stored in the ALU-side buffer 302 may be used as an input to a filtering task performed by the filter bank 306 or may be the output of a filtering task performed by the filter bank 306. For example, the ALU-side buffer 302 may be configured to store: (i) the results of pixel shader tasks received from the ALU clusters 102 which are used as an input to a pixel filtering task performed by the filter bank 306, and (ii) the result of a texture filtering task performed by the filter bank 306.

The memory-side buffer 304 is configured to temporarily store data received from, and sent to, memory. Data stored in the memory-side buffer 304 may be used as an input to a filtering task performed by the filter bank 306 or may be the result of a filtering task performed by the filter bank 306 which may be written out to memory. For example, the memory-side buffer 304 may be configured to store (i) the result of a pixel filtering task performed by the filter bank 306 which is sent to memory (not shown); and (ii) texels read from memory which are used as an input to a texture filtering task performed by the filter bank 306. Accordingly, the ALU-side buffer 302 and the memory-side buffer 304, which may be collectively referred to as the data buffers, store the input to, and results of, filtering tasks performed by the filter bank 306.

In addition to storing the inputs to, and results of, filtering tasks performed by the filter bank 306, the data buffers 302 and 304 may also be used to store intermediate data produced during a filtering task performed by the filter bank 306. For example, as described in more detail below, some filtering tasks may require multiple passes of the filter bank 306 to complete the task. Specifically, the filter bank 306 may only be capable of performing a certain number of operations at once so complex filtering may be performed over multiple passes through the filter bank 306. In these cases, one or more passes through the filter bank may produce intermediate data that is used as the input to a subsequent pass. That intermediate data may be stored in the ALU-side buffer 302 or the memory-side buffer 304 depending, for example, on which of the buffers provided the input to that pass. For example, if the input to the pass of the filter bank 306 was provided by the memory-side buffer 304, the intermediate data generated by that pass may be stored in the ALU-side buffer 302; and if the input to the pass of the filter bank 306 was provided by the ALU-side buffer 302, the intermediate data generated by that pass may be stored in the memory-side buffer 304.

The filter bank 306 is logic that can be dynamically configured to perform any of a plurality of types of filtering on a set of input data. Performing a type of filtering on a set of input data may be referred to herein as performing a filtering task. The plurality of types of filtering include at least one type of texture filtering and at least one type of pixel filtering. Types of texture filtering include, but are not limited to bilinear filtering, trilinear filtering, anisotropic filtering and percentage closer filtering (PCF). The filter bank 306 may support any combination of these types of texture filtering. Types of pixel filtering include, but are not limited to down-sampling, up-sampling and box filtering to implement anti-aliasing such as MSAA. The filter bank 306 may support any combination of these types of pixel filtering.

The filter bank 306 may comprise one or more filter blocks 314 each of which can be configured to perform any of the plurality of types of filtering. Each filter block 314 may comprise a plurality of fixed arithmetic components which can be individually enabled or disabled so as to cause the filter block 314 to perform one of the supported types of filtering. For example, each filter block 314 may comprise a basic filter (e.g. a 2×2 filter) that can generate a weighted sum of a set of inputs; and one or more other arithmetic components which may be selectively enabled to perform more complex filtering. As described in more detail below, the basic filter may comprise n multiplication components (wherein n is an integer greater than one) which are each configured to multiply an input value and a filter weight, followed by a plurality of adder components that form an adder tree that produces the sum of the multiplication component outputs. Examples of the other arithmetic components include, but are not limited to, a compare component which compares two values, a minimum component which calculates the minimum of a set of values, a maximum component which calculates the maximum of a set of values, a scale/offset component which scales or applies an offset to a value, an addition component which produces the sum of two values, a subtract component which produces the difference of two values, and a shift component which shifts an input value by a certain value. An example implementation of a filter block 314 is described below with respect to FIG. 5.

As described above, in bilinear filtering the four nearest texels to the relevant position in a texture (e.g. the mapped texture co-ordinates) are read and are combined by a weighted average according to distance to produce the texture colour for a fragment. Accordingly, bilinear filtering may be performed by the basic 2×2 filter by providing the desired texels as the input data and using filter weights that represent the distance between the texels and the relevant position in the texture. Similarly, as described above, where a pixel is over sampled (e.g. there is more than one sample per pixel—e.g. there are a plurality of sub-samples) then the sub-samples (colour values) generated by a fragment/pixel shader which relate to a particular pixel may be combined (using a reconstruction filter) to determine the colour of the pixel. One common reconstruction filter is a one-pixel wide box filter which essentially generates the average of all the sub-samples corresponding to (or within) a pixel. Where there are four sub-samples per pixel then box filtering may be performed by a combination of the basic 2×2 filter and a shift component by providing the sub-samples as the input data to the basic 2×2 filter and using filter weights of one, and then dividing the output by 4 (which may be accomplished by a shift operation).

As described above, each filter block 314 may only be able to perform a certain number and/or combination of arithmetic operations at a time. These limitations may be imposed by the hardware used to implement a filter block 314. However, some filtering tasks, may require more than this number and/or combination of arithmetic operations. For example, a filter block may comprise hardware that can calculate the weighted sum of four inputs, but a filtering task may require the calculation of the weighted sum of a first set of inputs and the weighted sum of a second set of inputs. Accordingly, the same filter block may be used multiple times to implement or perform a more complex filtering task. For example, the filter block may be first used to calculate the weighted sum of the first set of inputs, and then used to calculate the weighted sum of the second set of inputs. Each time a filter block is used in relation to the same task is referred to here as a pass, or a hardware pass, of the filter block. Accordingly, each pass of a filter block 314, the filter block 314 receives input data from one of the data buffers 302, 304 and performs one or more arithmetic operations on the received data. In some cases, each pass may take one cycle (e.g. clock cycle) to complete. However, in other cases a pass may take more than one cycle (e.g. clock cycle).

For example, trilinear filtering interpolates between the results of two different bilinear filtering operations—i.e. the result of bilinear filtering performed on the two mipmaps nearest to the position of interest (e.g. the position of the relevant pixel or sample) are combined. Where a filter block 314 can perform one bilinear filter operation at a time, then during a first pass of the filter block 314 the filter block 314 may be configured to perform bilinear filtering on the first mipmap, and during a second pass of the filter block 314 the filter block 314 may be configured to perform bilinear filtering on the second mipmap and interpolate between the outputs of the two bilinear filter operations. It will be evident to a person of skill in the art that these are examples of how different filtering techniques or methods may be implemented in multiple passes, and the number of passes to implement a filtering method or technique is dependent on the components (e.g. basic filter and arithmetic components) and capabilities of each filter block.

In some cases, the arithmetic components of each filter block 314 may be configured so that each filter bank can perform at least bilinear filtering, trilinear filtering, anisotropic filtering, PCF filtering and box filtering to implement MSAA wherein:

bilinear filtering can be performed at full speed (e.g. one bilinear filtering output can be generated each clock cycle);

trilinear filtering can be performed at half speed (e.g. one trilinear filter output can be generated every two clock cycles);

anisotropic filtering can be performed at $1/x^{th}$ speed where x is the number of samples (e.g. an anisotropic filter with sixteen samples would run 16 times slower than bilinear filtering); and box filtering to implement MSAA wherein there are 4 samples per pixel can be performed a full speed (e.g. one MSAA box filter output can be generated each clock cycle).

In general, the more filter blocks 314 the more filtering tasks that can be performed in parallel by the filter bank. The number of filter blocks 314 may be selected so as to achieve a desired performance level. In some cases, the number of filter blocks 314 may be selected to provide a similar level of performance (e.g. the same peak filter rate) as the texture unit 114 and the pixel back end 116 that the input/output filter unit 202 is replacing. For example, if the texture unit 114 has a peak rate of 4 outputs per clock cycle and the pixel back end 116 has a peak rate of 4 pixels (colour values) per clock cycle and each filter block 314 has a peak rate of 1 texture or one pixel filter output per cycle then the filter bank 306 may comprise eight filter blocks 314 so that in any cycle four of the filter blocks 314 can be used to perform a texture filtering task and four of the filter blocks 314 can be used to perform a pixel filtering task. However, in other cases, the number of filter blocks 314 may be selected so as to provide a peak filter rate that is less than the peak filter rate provided by the texture unit 114 and the pixel back end 116 (e.g. half the rate). For example, if the texture unit 114 has a peak rate of four outputs per clock cycle and the pixel back end 116 has a peak rate of four output pixels (colour values) per clock cycle, then the filter bank 206 may comprise only four filter blocks 314. This may reduce the performance in a small number of cases, but may have little impact on the overall performance, yet it may produce area and/or power savings.

The weight buffer and control logic unit 308 comprises a weight buffer for storing the filter weights for the filtering tasks and control logic for controlling the filter blocks 314 to perform filtering tasks. As described in more detail below, the filter weights stored in the weight buffer may be generated by a weight generator such as the weight generator 312 of FIG. 3 or they may be loaded from memory. In some cases, the weights may not be immediately removed from the weight buffer after they have been used for a filtering task to allow the filter weights to be reused for a subsequent filtering task. In other words, in some cases, the filter weights may be cached. In some cases, a filtering task may require one or more additional parameters. For example, if a shift is to be performed as part of a filtering task the amount of the shift may be a parameter that is provided to the filter block 314. In these cases, the additional parameters may also be stored in the weight buffer.

The control logic is configured to cause the filter blocks 314 to perform filtering tasks. Each filtering task is defined by, or comprises, input data (which is stored in one of the data buffers 302, 304), filter weights (which are stored in the weight buffer and control logic unit 308), and a type of filtering (which is one of a plurality of supported types of filtering). As described above, in some cases, a filtering task may also comprise additional parameters (which may also be stored in the weight buffer). The control logic is configured to provide the appropriate input data from the appropriate data buffer 302, 304, and the appropriate filter weights (and optionally other parameters) from the weight buffer to a filter block 314 and cause that filter block 314 to perform a specific type of filtering. The control logic may be configured to cause a filter block 314 to perform a specific type of filtering by, for example, causing the filter block 314 to enable and disable a specific combination of the arithmetic components therein. The control logic may be configured to cause a filter block to perform a specific type of filtering by sending the filter block one or more control signals.

In some cases, the input/output filter unit 202 may also comprise a texture address generator 310. As described above, texture filtering generally comprises obtaining or reading one or more texels of a texture near a position of interest in the texture and performing filtering on the obtained texels. The texture address generator 310 may be configured to generate the address of the relevant texels for a position of interest in the texture. In some cases, the texture address generator 310 may be configured to receive information identifying the position (e.g. the x, y co-ordinates) of the relevant pixel or fragment in the rendering space and map the received position (e.g. x, y co-ordinates) to a set of u, v co-ordinates, which may be referred to as the mapped texture co-ordinates. The mapped texture co-ordinates identify a specific position in the texture which may be referred to as the relevant position or the position of interest in the texture. In other cases, the texture address generator 310 may simply receive a set of u,v co-ordinates defining the position of interest as an input. For example, each vertex may be associated with a set of u,v co-ordinates and when a primitive is rasterized (e.g. converted into one or more fragments) the u,v co-ordinates of the primitive's vertices may be interpolated to generate a set of u,v co-ordinates for the fragment.

In either case, the u,v co-ordinates defining the position of interest in the texture are used to identify the relevant texels and the addresses thereof (e.g. the u, v co-ordinates thereof). The relevant texels for a position of interest and the number of relevant texels may be based on the specific type of texture filtering to be performed. Accordingly, in addition to receiving information identifying the position of interest (or receiving information from which the position of interest can be generated) the texture address generator 310 may also be configured to receive information identifying the type of texture filtering to be performed. For example, for bilinear filtering only the four closest texels to the position of interest in the texture are obtained. However, for trilinear filtering the texels forming the two mipmaps nearest the point of interest are obtained.

The texture addresses (e.g. u, v co-ordinates) generated by the texture address generator 310 may then be used to obtain or read the relevant texels from memory. The generated texture addresses (e.g. u, v co-ordinates) may also be provided to a weight generator (e.g. weight generator 312) for generating the appropriate filter weights for those texels. In other cases, the input/output filter unit 202 may not comprise a texture address generator and the texture addresses may be generated by another component or unit, such as, but not limited to, an ALU cluster 102.

Figure 5:
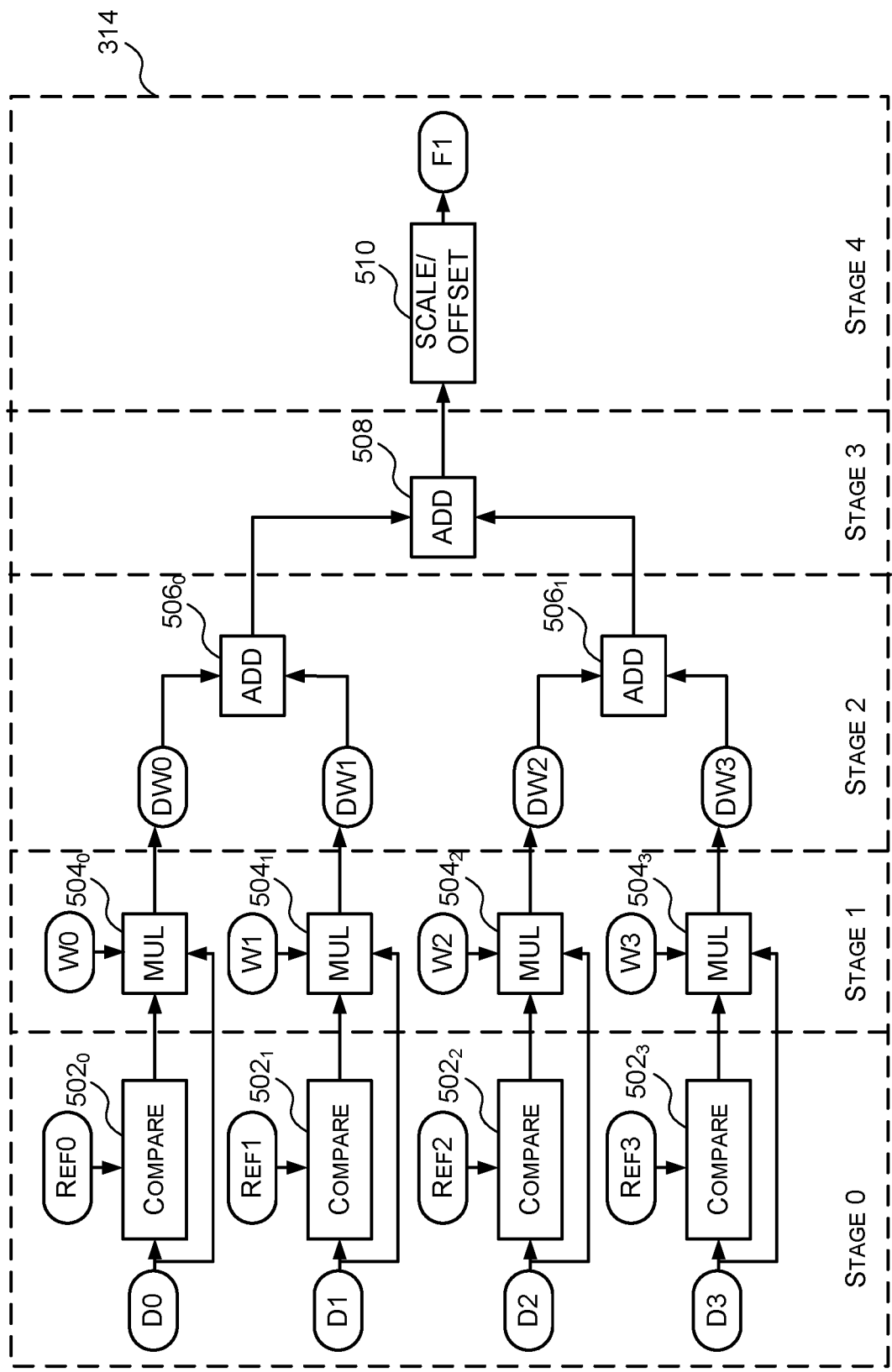
FIG. 5 is a block diagram of an example implementation of a filter block of FIG. 3.

In some cases, the input/output filter unit 202 may also comprise a weight generator 312. The weight generator 312 is configured to generate the filter weights for a filtering task. The number and/or calculation of the filter weights may be based on the type of filtering to be performed. Accordingly, the weight generator may be configured to receive information identifying the filtering method or type of filtering to be performed. For texture filtering the weight generator 312 may be configured to also receive information identifying the location of the relevant texels (e.g. the texture addresses generated by the texture address generator 310) in the texture and calculate the weights for the identified texture filtering method based thereon. For example, for bilinear filtering or trilinear filtering the weight generator 312 may be configured to generate filter weights based on the distance between the relevant texels and the position of interest in the texture. For example, as shown in FIG. 5, if the closest texels (the texels in the smallest mipmap) to a point of interest x are c0, c1, c2 and c3, the result of bilinear filtering applied to those texels can be expressed as $c=(1-t)*(1-s)*c0+(1-t)*s*c1+t*(1-s)*c2+t*s*c3$. Accordingly, the filter weight for the texels c0, c1, c2 and c3 are w0, w1, w2 and w3 respectively wherein $w0=(1-t)*(1-s)$, $w1=(1-t)*s$, $w2=t*(1-s)$ and $w3=t*s$. It will be evident that this is an example only and that a person of skill in the art would understand how to generate the filter weights for different types of filtering.

In some cases, the weight generator 312 may only be able to generate filter weights for texture filtering. In other cases, the weight generator 312 may be able to generate filter weights for one or more other types of filtering, such as, fixed weight filtering. A fixed weight filter type is a filter that always uses the same weights. Examples of fixed weight types of filtering include, but are not limited to, box filtering, Gaussian filtering and tent filtering (which may also be referred to as triangle filtering). In contrast, bilinear filtering uses different filter weights depending on the data to be filtered so bilinear filtering is not a type of fixed weight filtering. The types of filtering for which the weight generator 312 can generate filter weights may only be a subset of the supported types of filtering (i.e. fewer than all of the supported types of filtering). In some cases, the types of filtering that the weight generator 312 may generate filter weights for may be hard-coded or may be dynamically configurable.

The filter weights generated by the weight generator 312 may be output and stored in the weight buffer and control logic unit 308. In other cases, the input/output filter unit 202 may not comprise a weight generator and the filter weights may be generated by another component or unit, such as, but not limited to an ALU cluster 102, or they may be retrieved from memory.

In FIG. 3 there are data paths 316 between the filter bank 306 and the ALU-side buffer 302, and data paths 318 between the filter bank 306 and the memory-side buffer 304, to allow the filter bank 306 to write data to, and read data from, the data buffers 302, 304. In some cases, the data paths 316, 318 between the filter bank 306 and the data buffers 302, 304 may be sufficiently wide to allow all of the filter blocks 314 to be reading and/or writing data to the same data buffer 302, 304 at the same time so as to allow all the filter blocks 314 to operate in parallel without stalling. The minimum size of the data paths 316, 318 to allow all of the filter blocks 314 to be reading and/or writing data to the same data buffer 302, 304 at the same time may be based on the format of the input and output data and the number of filter blocks 314. In some cases, each texel may be in an RGBA format which comprises a value for each of the red, green, blue and opacity channels. Where each channel value is a 32-bit floating point value each texel will be 128 bits. Where four texels can be read and processed in a texture filtering task and eight texture filtering tasks can be performed in parallel then the data path may be at least $128 \times 4 \times 8 = 4096$ bits wide.

In FIG. 3 there are also data paths 320, 322 between the data buffers 302, 304 and the ALU cluster(s) 102 and memory. In some cases, these data paths 320, 322 may be narrower than the data paths 316, 318 between the data buffers 302, 304 and the filter bank 306. This is because there is likely to be less data transferred between the ALU cluster(s) 102 and the ALU-side buffer 302, and between memory and the memory-side buffer 304, than between the data buffers 302, 304 and the filter bank 306 due to re-use of data between filtering tasks—e.g. re-use of neighbouring values when running sliding window filters. For example, each bilinear texture filtering task for a fragment may read four texels from the memory-side buffer 304, however bilinear texture filtering tasks for adjacent fragments may use some of the same texels so four texels may not have to be read from memory for each bilinear texture filtering task. In other words, although eight texels may be read from the memory-side buffer 304 to perform two bilinear texture filtering tasks, less then eight texels may be read from memory for the two bilinear texture filtering tasks since the two tasks may use some of the same texels. Accordingly, less data needs to be read from memory than from the memory side buffer to execute the two bilinear texture filtering tasks.

Reference is now made to FIG. 5 which illustrates an example implementation of a filter block 314 of FIG. 3. The example filter block 314 is implemented as a pipeline of arithmetic components. The pipeline comprises five stages numbered 0 to 4. The first pipeline stage (STAGE 0), which may be referred to as the compare stage, comprises four compare components $502_0$, $502_1$, $502_2$, and $502_3$. The $i^{th}$ compare component $502_0$, $502_1$, $502_2$, and $502_3$ is configured to receive an input data value Di from one of the data buffers 302, 304, and a reference value REFi from the weight buffer and control logic unit 308, and compare the input data value Di to the reference value and output a '0' or '1' based on the comparison. For example, in some cases a compare component $502_0$, $502_1$, $502_2$, and $502_3$ may output a '1' if the data value Di is larger than the reference value REFi, and a '0' otherwise. However, it will be evident to a person of skill in the art that this is an example only and that in other examples a compare component $502_0$, $502_1$, $502_2$, and $502_3$ may output a '0' if the data value Di is larger than the reference value REFi, and a '1' otherwise. The compare stage may be used to implement PCF filtering. Specifically, in PCF filtering the input data is first compared against a reference value before it is filtered. In PCF filtering each input data value is compared against the same reference value (e.g. REF0=REF1=REF2=REF3), but in other types of filtering different input data values may be compared against different reference values.

The second pipeline stage (STAGE 1), which may be referred to as the multiply stage or the multiplication stage, comprises four multiplication components $504_0$, $504_1$, $504_2$, and $504_3$. The $i^{th}$ multiplication component $504_0$, $504_1$, $504_2$, and $504_3$ is configured to receive either the input data value Di (if the compare stage or the corresponding compare component is disabled) or the output of the corresponding compare component $502_0$, $502_1$, $502_2$, and $502_3$, and a filter weight Wi from the weight buffer, and generate and output the product of the inputs DWi. For example, where a multiplication component 504i receives the original input data value Di and a weight Wi then the multiplication component 504i calculates and outputs Di*Wi. The product of the inputs DWi may be referred to as the weighted data point.

The third pipeline stage (STAGE 2), which may be referred to as the first adder stage, comprises two adder components $506_0$ and $506_1$. Each adder component $506_0$ and $506_1$ receives two of the weighted data points DWi, and calculates and outputs the sum of the received weighted data points. For example, the first adder component $506_0$ of the third pipeline stage receives the weighted data points DW0 and DW1 generated by the first and second multiplication components $504_0$ and $504_1$ of the second pipeline stage, and calculates and outputs DW0+DW1; and the second adder component $506_1$ of the third pipeline stage receives the weighted data points DW2 and DW3 generated by the third and fourth multiplication components $504_2$ and $504_3$ and calculates and outputs DW2+DW3.

The fourth pipeline stage (STAGE 3), which may be referred to as the second adder stage, comprise a single adder component 508 that receives the outputs of the adder components $506_0$ and $506_1$ in the third pipeline stage, and calculates and outputs the sum thereof. It can be seen that together the third and fourth pipeline adder stages form an adder tree that produces the sum of the multiplication component $504_0$, $504_1$, $504_2$, and $504_3$ outputs (i.e. a sum of the weighted data points—DW0+DW1+DW2+DW3). It can also be seen that together the second, third and fourth pipeline stages (STAGE 1, STAGE 2, STAGE 3) form a filter unit that calculates the weighted sum of four values. The second, third and fourth pipeline stages (STAGE 1, STAGE 2, STAGE 3) can alternatively be described as implementing a convolution engine or convolution operation between four input data points and four filter weights.

The fifth pipeline stage (STAGE 4), which may be referred to as the scale/offset stage, comprises a scale/offset component 510 which is configured to receive the output of the fourth pipeline stage (STAGE 3) and apply a scale or an offset to the received value to generate a filtered output F1. In some cases, the scale or offset applied to the received value by the scale/offset component 510 may be configurable. For example, a scale or offset value may be stored in memory (e.g. in the weight buffer and control logic unit 308) and provided to the filter block 314 as part of the control data. The same offset or scale may be used for a particular texture—type of filtering combination. For example, a scale of 2 may be used for any bilinear filtering task related to a particular texture.

The filtered output F1 may be stored in one of the data buffers 302, 304. In some cases, the filtered output F1 may alternatively or additionally be provided as an input to the filter block 314 in the next cycle (e.g. next clock cycle). For example, there may be a feedback path between the output of the pipeline and the input of the pipeline. For example, there may be a feedback path (not shown) between the scale/offset component 510 output and, for example, the input D0 to the first compare component $502_0$. Then, if the filtered output F1 is to be used in the next pass of the filter block 314, the filtered output F1 is provided to the first compare component $502_0$ via the feedback path. This may save having to write the filtered output F1 to memory and subsequently read F1 from memory for the next pass.

The weight buffer and control logic unit 308 is configured to control the filter block 314 so as to perform or implement a specific filter type. This may comprise selectively enabling and/or disabling the arithmetic components ($502_0$, $502_1$, $502_2$, $502_3$, $504_0$, $504_1$, $504_2$, $504_3$, $506_0$, $506_1$, 508, 510) of the filter block 314. The weight buffer and control logic unit 308 may be able to enable or disable whole stages (e.g. all the compare components) and/or enable or disable individual arithmetic components (e.g. a single compare component). For example, to cause the filter block 314 to implement a bilinear filtering task or a box filtering task the weight buffer and control logic unit 308 may be configured to disable the compare stage (e.g. all the compare components $502_0$, $502_1$, $502_2$, $502_3$) and enable all of the other stages (e.g. all of the other components $504_0$, $504_1$, $504_2$, $504_3$, $506_0$, $506_1$, 508, 510). The difference between a bilinear filtering task and a box filtering task is that for bilinear filtering each of the weights (W0, W1, W2, W3) may be different whereas for box filtering all of the weights are the same (e.g. 1). In another example, to cause the filter block 314 to implement PCF filtering the weight buffer and control logic unit 308 may be configured to enable all of the arithmetic components ($502_0$, $502_1$, $502_2$, $502_3$, $504_0$, $504_1$, $504_2$, $504_3$, $506_0$, $506_1$, 508, 510).

In some cases, the weight buffer and control logic unit 308 may be in communication with each of the arithmetic components ($502_0$, $502_1$, $502_2$, $502_3$, $504_0$, $504_1$, $504_2$, $504_3$, $506_0$, $506_1$, 508, 510) of the filter block 314 and may be able to enable or disable any of the arithmetic components by sending an enable or disable signal respectively to that arithmetic component. In other cases, the filter block 314 may comprise an internal control unit (not shown) that is in communication with the weight buffer and control logic unit 308 and each of the arithmetic components, and the weight buffer and control logic unit 308 is configured to send a control signal to the internal control unit which indicates which arithmetic components are to be enabled and which are to be disabled, and the internal control unit enables and disables the arithmetic components accordingly. As described above, in some cases, a filtering task may be performed over multiple passes of a filter block 314. In these cases, the weight buffer and control logic unit 308 may be configured to treat each pass as a separate control item. Specifically, the weight buffer and control logic unit 308 may be configured to generate a separate set of control signals for each pass.

In some cases, the weight buffer and control logic unit 308 may receive information (e.g. state information) and/or one or more control signals (e.g. instructions) which cause the weight buffer and control logic unit 308 to cause the filter bank 306 to perform a particular filtering task. The information or control signals which cause the weight buffer and control logic unit 308 to cause the filter bank 306 to perform a particular filtering task may be generated, for example, by the ALU clusters 102. For example, in some cases, an ALU cluster 102 may be configured to, as part of executing a pixel shader task, issue an instruction or a set of instructions to the input/output filter unit 202 which cause the input/output filter unit to perform a particular texture filtering task for a fragment/pixel and return the results of the texture filtering task to the ALU cluster 102; and/or when an ALU cluster 102 completes a pixel shader task the ALU cluster may be configured to issue an instruction or set of instructions which cause the input/output filter unit 202 to perform a pixel filtering task on the output of the pixel shader task. In other cases, instead of issuing instructions to the input/output filter unit 202 to cause a filtering task to be performed, the ALU cluster 102 may be configured to store, alongside the data to be filtered, state data, which when read by the weight buffer and control logic unit 308, causes the weight buffer and control logic unit 308 to cause the filter bank 306 to perform a filtering operation on the stored data.

While the example filter block 314 of FIG. 5 is configured to implement a 4 input data×4 weight filter, it will be evident to a person of skill in the art that this is an example only and that other example filter blocks may implement other size filters (e.g. a 2 input data×2 weight filter or an 8 input data×8 weight filter). It is noted, however, that using a 4 input data×4 weight filter as the base filter allows bilinear filtering of four texels, and RGBA pixel (e.g. pixels comprises of four values) processing to be performed efficiently which are common tasks performed by the texture unit 114 and pixel back end 116 of FIG. 1 respectively. It is also noted that larger filters may be implemented via multiple passes of the filter block 314.

It will be evident to a person of skill in the art that the combination and arrangement of arithmetic components shown in FIG. 5 is merely an example and that in other examples a filter block 314 may comprise additional, different and/or a different arrangement of, arithmetic components. For example, in some cases, the filter block 314 may further comprise a mix/blend component (not shown) which is configured to mix or blend the output of the scale/offset component with other data, such as data from a previous pass of the filter block 314.

In some cases, to make the input/output filter unit 202 more useful and/or more versatile the filter blocks 314 may be capable of performing additional operations that may not have typically been performed by the texture unit 114 or the pixel back end 116 of FIG. 1 but are similar to the operations performed thereby. Specifically, in addition to being used for vertex and pixel processing the filter blocks 314 may also be able to perform generalised compute tasks or functions such as, but not limited to, image processing, implementing camera ISP algorithms, and neural network processing. In particular, since neural network operations are quite similar to filter operations (e.g. they often involve performing a convolution operation which involves calculating the weighted sum of a set of inputs), the filter blocks may also be configured to perform neural network operations. In addition to increasing the usefulness and/or versatility of the input/output filter unit 202 this may eliminate the need for a separate neural network accelerator in a GPU. Other similar functions and operations which may be suitable for being performed via the input/output filter unit 202 may be other filters that use convolutions or weighted sums. Such operations include, but are not limited to, colour space conversion, gaussian filters, edge aware filters/scalers (including advanced edge-aware MSAA filters).

In some cases, the filter blocks 314 may be configured so as to be able to perform blending. Specifically, trilinear filtering, and by extension anisotropic filtering, is similar in operation to sampling multiple textures and blending those layers together. Specifically, trilinear filtering takes the output of bilinear filtering performed on two different mipmap levels and blends these results together using a weighted mix (e.g. (1−a)×Csource+a×Cdest), which is a common blending mode implemented by the ALU clusters. Accordingly, the filter blocks 314 may be configured so as to be capable of performing simple texture blending, as used in graphic user interfaces (GUIs) and composition, which may comprise blending layers without complex arithmetic. This may increase the complexity of the filter blocks 314 but may allow blending to be performed as a back end operation as data is written from the ALU clusters to memory (e.g. tile buffers). This may allow the GPU to enter a much lower power mode where the ALU clusters do not have to be enabled when blending a couple of composition of blend surfaces.

In some cases, the filter blocks 314 may also be configured to perform format conversion. For example, the filter blocks 314 may be able to convert an RGB colour (which has a value for the red channel R, a value for the green channel G, and a value for the blue channel B) to YUB (which stores the brightness (luminance) as the Y value, and the colour (chrominance) as U and V values) or vice versa by using a set of hard coded weights.

In the past, the data (texels) input to the texture unit 114 was typically in a different format from the data (pixels/samples) output by the ALU clusters so it would have been difficult to create a generic unit that could process both data formats. However, now both types of data are often in a 16-bit floating point format. Accordingly, in some cases the filter bank 306 and the filter blocks 314 thereof may be configured to support 16-bit floating point operations. However, in other cases, the filter bank 306 and the filter blocks 314 thereof may be configured to support a plurality of data or number formats. The plurality of data formats supported by the filter bank 306 and the filter blocks thereof may include 32-bit floating point format (e.g. R16G16B16A16_FLOAT), 8-bit fixed point or integer format (e.g. RGBA8888) and 10-bit fixed point of integer format (e.g. R10G10B10A2) and/or one more smaller formats such as, but not limited to, 444, 565, and 5551. These smaller formats may be supported by unpacking them into a wider format to avoid overcomplicating the format support in the filter bank 306 itself. In some cases (e.g. if neural network operations are supported by the filter bank 306) it may also be beneficial to support dual rate 8-bit fixed point or integer format which allows the filter bank 306 to either perform 16-bit operations or two 8-bit operations.

Figure 6:
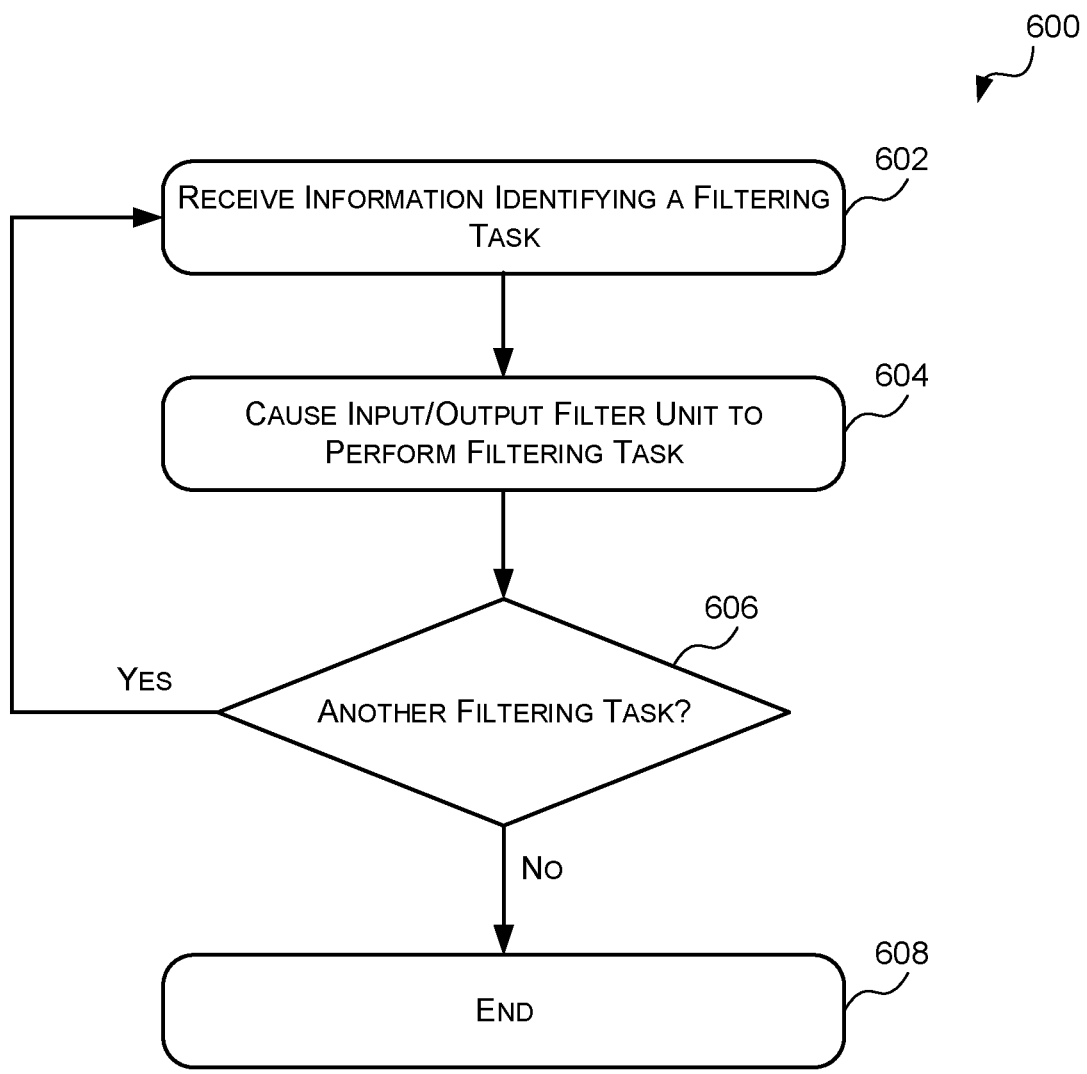
FIG. 6 is a flow diagram of an example method of controlling the input/output filter unit of FIG. 3.

Reference is now made to FIG. 6 which illustrates an example method 600 for controlling the input/output filter unit 202 of FIG. 3 which may be implemented by the control logic of the weight buffer and control logic unit 308. The method 600 begins at block 602 where the control logic receives information and/or control signals identifying a filtering task. The information identifying a filtering task may comprise information identifying a set of data stored in one of the data buffers 302, 304, a set of filter weights stored in the weight buffer and control logic unit 308, and a type of filtering of a plurality of types of filtering. The plurality of types of filtering comprises one or more types of texture filtering and one or more types of pixel filtering. As described above, in some cases, the information identifying a filtering task may also comprise additional parameters such as, but not limited to, the amount of a shift or a comparison value.

As described above, the information or control signals identifying a particular filtering task may be generated, for example, by the ALU clusters 102. For example, in some cases, an ALU cluster 102 may be configured to, as part of executing a pixel shader task, issue an instruction or a set of instructions to the control logic identifying a particular texture filtering task to be performed on a fragment/pixel; and/or when an ALU cluster 102 completes a pixel shader task the ALU cluster may be configured to issue an instruction or set of instructions identifying a pixel filtering task to be performed on the output of the pixel shader task. In other cases, instead of sending information or control signals to the control logic the ALU cluster 102 may be configured to store, alongside the data to be filtered, state data which, when read by the control logic, identifies a filtering task to be performed on the stored data. Once the control logic has received information identifying a filtering task the method 600 proceeds to block 604.

At block 604, the control logic causes the filter bank 306 to perform the identified filtering task. Specifically, the control logic causes the filter bank 306 to perform the identified type of filtering on the identified set of data using the identified set of weights.

The control logic may be configured to provide the identified set of data from the appropriate data buffer 302, 304, and the identified filter weights (and optionally other parameters) from the weight buffer and control logic unit 308 to the filter bank 306 and cause the filter bank 306 to perform the identified type of filtering on the received set of data using the received set of weights. The control logic may be configured to cause the filter bank 306 to perform a specific type of filtering by sending the filter bank 306 one or more control signals. Where the filter bank 306 comprises one or more filter blocks 314 each with a plurality of arithmetic components, the control logic may be configured to cause a filter block 314 to perform a specific type of filtering by, for example, selectively enabling and/or disabling a specific combination of the arithmetic components of the filter block 314. As described above, where the arithmetic components are divided into stages the control logic may be able to enable or disable whole stages (e.g. all the compare components) and/or enable or disable individual arithmetic components (e.g. a single compare component).

As described above, some filtering tasks may require multiple passes of the filter bank 306 to complete the task. In these cases, the control logic may be configured to treat each pass as a separate control item. Specifically, the control logic may be configured to generate a separate set of control signals for each pass. For example, the control logic may be configured to cause one of the filter blocks 314 to perform a first portion of the type of filtering in a first pass of the filter block 314 and a second portion of the type of filtering in a second pass of the filter block 314. Once the control logic has caused the filter bank 306 to perform the identified filtering task the method 600 may end 608 or the method 600 may proceed to block 606.

At block 606 a determination is made as to whether there is another filtering task to perform. If there is another filtering task to be performed then the method 600 proceeds back to block 602. If there is not another filtering task to be performed then the method 600 ends 608.

Although FIG. 6 describes controlling the input/output filter unit to perform a single filtering task, when the filter bank of the input/output filter unit comprises a plurality of filter blocks each of which can perform a filtering task, multiple filtering tasks may be performed by the input/output filter unit in parallel. In these cases, method 600 of FIG. 6 may be executed for each filtering task.

Figure 7:
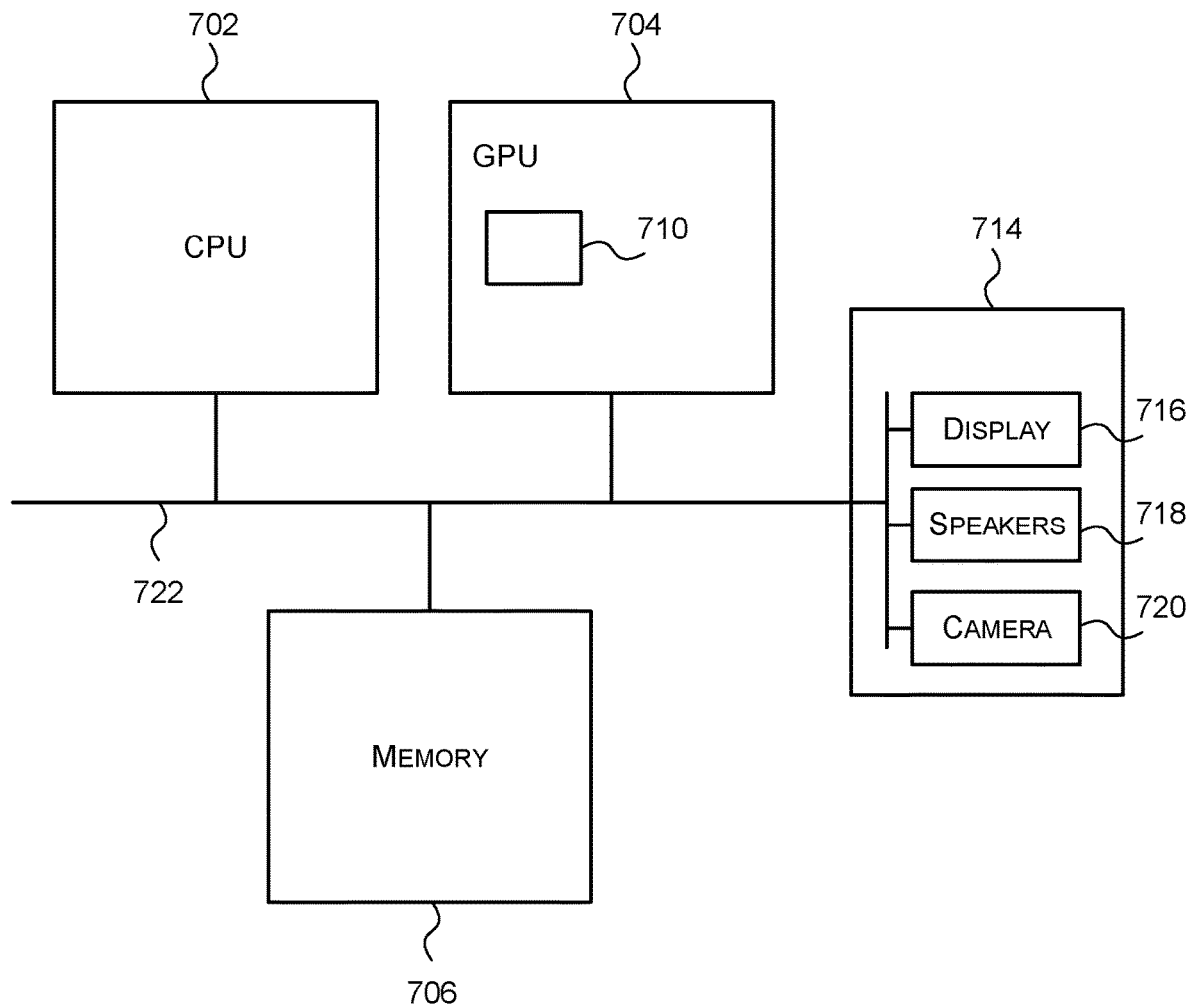
FIG. 7 is a block diagram of an example computer system in which the input/output filter units and/or the graphics processing units described herein may be implemented.

FIG. 7 shows a computer system in which the input/output filter units 202 described herein may be implemented. The computer system comprises a CPU 702, a GPU 704, a memory 706 and other devices 714, such as a display 716, speakers 718 and a camera 720. A processing block 710 (which may be an input/output filter unit 202 described herein) is implemented on the GPU 704. In other examples, the processing block 710 may be implemented on the CPU 702. The components of the computer system can communicate with each other via a communications bus 722.

The input/output filter units and graphics processing units of FIGS. 1, 2, and 3 are shown as comprising a number of functional blocks or units. This is schematic only and is not intended to define a strict division between different logic elements of such entities. Each functional block or unit may be provided in any suitable manner. It is to be understood that intermediate values described herein as being formed by a block or unit need not be physically generated by an input/output filter unit or a graphics processing unit at any point and may merely represent logical values which conveniently describe the processing performed by the input/output filter unit or the graphics processing unit between its input and output.

The input/output filter units and/or graphics processing units described herein may be embodied in hardware on an integrated circuit. The input/output filter units and/or graphics processing units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture an input/output filter unit or a graphics processing unit configured to perform any of the methods described herein, or to manufacture a processor comprising any apparatus described herein. An integrated circuit definition dataset may be, for example, an integrated circuit description.

Therefore, there may be provided a method of manufacturing, at an integrated circuit manufacturing system, an input/output filter unit or a graphics processing unit as described herein. Furthermore, there may be provided an integrated circuit definition dataset that, when processed in an integrated circuit manufacturing system, causes the method of manufacturing an input/output filter unit or a graphics processing unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an input/output filter unit or a graphics processing unit will now be described with respect to FIG. 8.

Figure 8:
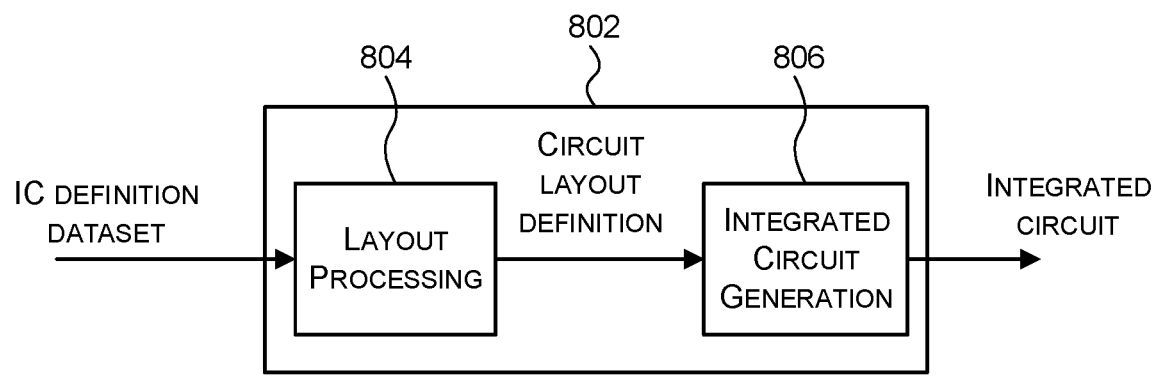
FIG. 8 is a block diagram of an example integrated circuit manufacturing system for generating an integrated circuit embodying an input/output filter unit and/or a graphics processing unit described herein.

FIG. 8 shows an example of an integrated circuit (IC) manufacturing system 802 which is configured to manufacture an input/output filter unit and/or a graphics processing unit as described in any of the examples herein. In particular, the IC manufacturing system 802 comprises a layout processing system 804 and an integrated circuit generation system 806. The IC manufacturing system 802 is configured to receive an IC definition dataset (e.g. defining an input/output filter unit or a graphics processing unit as described in any of the examples herein), process the IC definition dataset, and generate an IC according to the IC definition dataset (e.g. which embodies input/output filter unit or a graphics processing unit as described in any of the examples herein). The processing of the IC definition dataset configures the IC manufacturing system 802 to manufacture an integrated circuit embodying a storage unit allocator or a graphics processing unit as described in any of the examples herein.

The layout processing system 804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an input/output filter unit or a graphics processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. An input/output filter unit for use in a graphics processing unit, the input/output filter unit comprising:
   a first buffer;
   a second buffer;
   a filter bank configurable to perform any of a plurality of types of filtering on a set of data, the plurality of types of filtering comprising one or more types of texture filtering and one or more types of pixel filtering; and
   control logic configured to cause the filter bank to: (i) perform one of the plurality of types of filtering on a set of data stored in one of the first and second buffers using a set of weights, and (ii) store the results of the filtering in one of the first and second buffers.

2. The input/output filter unit of claim 1, wherein the filter bank comprises one or more filter blocks, each filter block of the one or more filter blocks comprising a plurality of arithmetic components that can be selectively enabled so as to cause the filter bank to perform one of the plurality of types of filtering.

3. The input/output filter unit of claim 2, wherein the plurality of arithmetic components are configured so as to form a pipeline.

4. The input/output filter unit of claim 2, wherein the plurality of arithmetic components comprises a set of arithmetic components that form an n input×n weight filter wherein n is an integer.

5. The input/output filter unit of claim 4, wherein the set of arithmetic components comprises n multiplier components each of which is configured to multiply an input value and a weight, and a plurality of adder components that form an adder tree that is configured to produce a sum of the outputs of the n multiplier components.

6. The input/output filter unit of claim 4, wherein the plurality of arithmetic components further comprises n comparators each of which is configured to compare an input value to a reference value and provide a result of the comparison as an input to the n input×n weight filter.

7. The input/output filter unit of claim 4, wherein the plurality of arithmetic components further comprises a scaling component configured to receive the output of the n input×n weight filter and generate a scaled version thereof.

8. The input/output filter unit of claim 2, wherein the filter bank comprises a plurality of filter blocks.

9. The input/output filter unit of claim 2, wherein the control logic is configured to cause the filter bank to perform one of the plurality of types of filtering on the set of data stored in one of the first and second buffers using the set of weights by causing one filter block of the one or more filter blocks to perform a first portion of the type of filtering in a first pass of the filter block and a second portion of the type of filtering in a second pass of the filter block.

10. The input/output filter unit of claim 9, wherein temporary data is generated during at least one of the first pass and the second pass which is stored in one of the first and second buffers.

11. The input/output filter unit of claim 1, wherein the one or more types of texture filtering comprise one or more of bilinear filtering, trilinear filtering, anisotropic filtering and percentage closer filtering.

12. The input/output filter unit of claim 1, wherein the one or more types of pixel filtering comprise one or more of down-sampling, up-sampling and multiple sampling anti-aliasing box filtering.

13. The input/output filter unit of claim 1, wherein the filter bank is further configurable to perform texture blending and/or a set of convolution operations as part of processing a convolution layer of a neural network.

14. The input/output filter unit of claim 1, further comprising a texture address generator configured to generate an address for one or more relevant texels for performing a type of texture filtering of the one or more types of texture filtering for a fragment or a pixel.

15. The input/output filter unit of claim 1, further comprising a weight generator configured to generate the set of weights for performing one or more types of filtering of the plurality of types of filtering.

16. The input/output filter unit of claim 1, wherein the first buffer is configured to store data received from, and output to, an arithmetic logic unit cluster configured to perform shading tasks and the second buffer is configured to store data received from, and output to, memory of the graphics processing unit.

17. The input/output filter unit of claim 16, wherein:
   the control logic is configured to cause the filter bank to perform a filtering task of a plurality of filtering tasks, the plurality of filtering tasks comprising texture filtering tasks and pixel filtering tasks;
   causing the filter bank to perform a pixel filtering task comprises causing the filter bank to perform one of the one or more types of pixel filtering on a set of data stored in the first buffer by the arithmetic logic unit cluster using a set of weights, and store the results of the pixel filtering in the second buffer to be output to the memory; and
   causing the filter bank to perform a texture filtering task comprises causing the filter bank to perform one of the one or more types of texture filtering on a set of data stored in the second buffer from the memory using a set of weights, and store the results of the texture filtering in the first buffer to be output to the arithmetic logic unit cluster.

18. A method of controlling an input/output filter unit comprising a first buffer, a second buffer and a configurable filter bank, the method comprising:
   receiving information identifying a filtering task, the information identifying a filtering task comprising information identifying a set of data stored in one of the first and second buffers, a set of weights and a type of filtering of a plurality of types of filtering, wherein the plurality of types of filtering comprises one or more types of texture filtering and one or more types of pixel filtering; and causing the configurable filter bank to:
perform the identified type of filtering on the identified set of data using the identified set of weights, and
store results of the filtering in one of the first and second buffers.

19. A graphics processing unit comprising the input/output filter unit as set forth in claim 1.

20. A non-transitory computer readable storage medium having stored thereon a computer readable dataset description of the input/output filter unit as set forth in claim 1 that, when processed in an integrated circuit manufacturing system, causes the integrated circuit manufacturing system to manufacture an integrated circuit embodying the input/output filter unit.

* * * * *